United States Patent
Soeno et al.

(10) Patent No.: US 7,597,972 B2
(45) Date of Patent: Oct. 6, 2009

(54) MAGNETIC RECORDING MEDIUM INCLUDING A PATTERNED INTERMEDIATE LAYER AND A NON-PATTERNED SOFT MAGNETIC LAYER AND MANUFACTURING METHOD THEREOF

(75) Inventors: Yoshikazu Soeno, Tokyo (JP); Mitsuru Takai, Tokyo (JP); Katsumichi Tagami, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 512 days.

(21) Appl. No.: 11/135,441

(22) Filed: May 24, 2005

(65) Prior Publication Data

US 2005/0287397 A1 Dec. 29, 2005

(30) Foreign Application Priority Data

Jun. 25, 2004 (JP) ............................. 2004-187672

(51) Int. Cl.
*G11B 5/667* (2006.01)
(52) U.S. Cl. ..................... 428/826; 428/827; 428/828; 428/832
(58) Field of Classification Search .................. None
See application file for complete search history.

(56) References Cited

U.S. PATENT DOCUMENTS

| | | | | |
|---|---|---|---|---|
| 5,748,421 A * | 5/1998 | Taki et al. | .................... | 360/135 |
| 5,766,718 A * | 6/1998 | Matsuda et al. | .......... | 428/848.5 |
| 6,347,016 B1 * | 2/2002 | Ishida et al. | .................. | 360/17 |
| 6,602,620 B1 * | 8/2003 | Kikitsu et al. | ............. | 428/842.2 |
| 7,008,704 B2 * | 3/2006 | Noma | ......................... | 428/814 |
| 7,097,924 B2 * | 8/2006 | Haginoya et al. | ........... | 428/829 |
| 7,149,045 B1 * | 12/2006 | Mallary et al. | ................ | 360/55 |
| 7,164,548 B2 | 1/2007 | Hattori et al. | | |
| 7,223,439 B2 * | 5/2007 | Suwa et al. | .................. | 427/127 |
| 7,417,826 B2 | 8/2008 | Hattori et al. | | |
| 2004/0175510 A1 * | 9/2004 | Hattori et al. | ................ | 427/454 |
| 2005/0186358 A1 * | 8/2005 | Sakai et al. | .................. | 427/548 |

FOREIGN PATENT DOCUMENTS

| | | |
|---|---|---|
| JP | A 7-129953 | 5/1995 |
| JP | 09-097419 | 4/1997 |
| JP | A 2000-251236 | 9/2000 |
| JP | 2003-030812 | 1/2003 |
| JP | 2004-039082 | 2/2004 |

* cited by examiner

*Primary Examiner*—Kevin M. Bernatz
(74) *Attorney, Agent, or Firm*—Oliff & Berridge, PLC

(57) ABSTRACT

A magnetic recording medium is provided which has good recording/reproducing characteristics with a recording layer divided in a number of recording elements by a predetermined concavo-convex pattern, and a manufacturing method that enables efficient manufacture of such a magnetic recording medium. The magnetic recording medium includes a substrate, a soft magnetic layer formed over the substrate, a recording layer formed over the soft magnetic layer such as to have magnetic anisotropy in a direction perpendicular to surface, and being divided in a number of recording elements by a predetermined concavo-convex pattern, and a non-magnetic intermediate layer formed between the recording layer and the soft magnetic layer. The recording elements are formed to have a predetermined track shape in a data region.

12 Claims, 5 Drawing Sheets

MAGNETIC RECORDING MEDIUM INCLUDING A PATTERNED INTERMEDIATE LAYER AND A NON-PATTERNED SOFT MAGNETIC LAYER AND MANUFACTURING METHOD THEREOF

BACKGROUND OF THE INVENTION

1. Field of the Invention

The present invention relates to a magnetic recording medium having a recording layer divided in a number of recording elements by a predetermined concavo-convex pattern, and its manufacturing method.

2. Description of the Related Art

There has been a remarkable increase in areal density of magnetic recording media such as hard discs by various improvements including reduction in the grain size of magnetic particles forming the recording layer, material changes, and increased precision in the processing of magnetic heads. Also, perpendicular recording type magnetic recording media, which have an enhanced areal density because of the recording layer having magnetic anisotropy in a direction perpendicular to surface, with a soft magnetic underlayer for further intensifying the recording magnetic field, are being put in use, and a further improvement in the areal density is expected.

On the other hand, it has become evident that existing techniques for increasing the areal density have reached their limits because of processing limits of magnetic heads, the problem of erroneous writing of data on adjacent tracks caused by spreading magnetic fields of the recording head, and the problem of crosstalk at the time of reproducing. Accordingly, magnetic recording media such as a discrete track medium and a patterned medium, in which a recording layer is formed in a predetermined concavo-convex pattern, are being developed as an alternative medium that enables a further increase in the areal density (see, for example, Japanese Patent Laid-Open Publication No. Hei 7-129953). Dry etching techniques can typically be used for the processing of a recording layer in a concavo-convex pattern.

To achieve good recording/reproducing characteristics, it is preferable that the recording layer be formed only as convex portions which are recording elements, and that the recording elements are completely divided from each other to the face on the substrate side. The concavo-convex pattern should be as flat as possible from the viewpoint of flying stability of head sliders, and so the concave portions should be preferably filled with a non-magnetic material to flatten the medium surface. From a manufacturing point of view, the concave portions of the concavo-convex pattern should have a minimum possible depth for the filling/flattening process. That is, the concave portions of the concavo-convex pattern should preferably be formed precisely to a depth that reaches the face on the substrate side of the recording layer.

However, in the processing of the recording layer into the concavo-convex pattern, precise formation of the concave portions to the depth that reaches the face on the substrate side of the recording layer is hard to achieve; it was usually the case that the soft magnetic layer under the recording layer was also processed in an attempt to thoroughly divide the recording elements from each other to the face on the substrate side. The soft magnetic layer usually has controlled magnetic domains and magnetic anisotropy in a direction perpendicular to the track direction (moving direction of the head), and partial processing of the soft magnetic layer will destroy these magnetic domains and anisotropy and increase magnetic noises, leading to deterioration of recording/reproducing characteristics. Moreover, with the concave portions being formed into the layer under the recording layer, the concave/convex height becomes larger, which may lower the head flying stability and deteriorate recording/reproducing characteristics.

These problems could be solved if the processing could be stopped before reaching to the face on the substrate side of the recording layer, but part of recording layer remaining in the concave portions may cause increased magnetic noises and deterioration of recording/reproducing characteristics.

SUMMARY OF THE INVENTION

In view of the foregoing problems, various exemplary embodiments of this invention provide a magnetic recording medium having good recording/reproducing characteristics with a recording layer divided in a number of recording elements by a predetermined concavo-convex pattern, and a manufacturing method that enables efficient manufacture of such a magnetic recording medium.

Various exemplary embodiments of this invention provide a magnetic recording medium having a substrate, a soft magnetic layer formed over the substrate, a recording layer formed over the soft magnetic layer such as to have magnetic anisotropy in a direction perpendicular to surface, and being divided in a number of recording elements by a predetermined concavo-convex pattern, and an intermediate layer formed between the recording layer and the soft magnetic layer, thereby achieving the objects.

Alternatively, various exemplary embodiments of this invention provide a magnetic recording medium having a substrate, a recording layer formed over the substrate such as to have magnetic anisotropy in a direction parallel to surface, and being divided in a number of recording elements by a predetermined concavo-convex pattern, and an intermediate layer formed between the recording layer and the substrate, thereby achieving the objects.

By forming the intermediate layer under the recording layer, the soft magnetic layer or the like under the recording layer is protected from the processing of the recording layer in which concave portions are formed through to the face on the substrate side of the recording layer, whereby good recording/reproducing characteristics are achieved. Moreover, by forming a layer that has properties of enhancing the orientability of the recording layer as the intermediate layer such as to be in contact with the recording layer on the substrate side of the recording layer, the recording/reproducing characteristics can be further improved.

Accordingly, various exemplary embodiments of the present invention provide a magnetic recording medium comprising:

a substrate;

a soft magnetic layer formed over the substrate;

a recording layer formed over the soft magnetic layer such as to have magnetic anisotropy in a direction perpendicular to surface, and being divided in a number of recording elements by a predetermined concavo-convex pattern; and an intermediate layer formed between the recording layer and the soft magnetic layer, wherein the recording elements are formed to have a predetermined track shape in a data region.

Alternatively, various exemplary embodiments of the present invention provide a magnetic recording medium comprising:

a substrate;

a recording layer formed over the substrate such as to have magnetic anisotropy in a direction parallel to surface, and being divided in a number of recording elements by a predetermined concavo-convex pattern; and an intermediate layer formed between the recording layer and the substrate, wherein the recording elements are formed to have a predetermined track shape in a data region.

Furthermore, various exemplary embodiments of the present invention provide a manufacturing method of a magnetic recording medium comprising:

an object-to-be-processed preparation step of preparing an object to be processed which is formed by a soft magnetic layer, an intermediate layer, and a recording layer that has magnetic anisotropy in a direction perpendicular to surface in this order over a substrate; and a recording layer processing step of processing the object to be processed by etching to divide the recording layer into a number of recording elements by a predetermined concavo-convex pattern such that the recording elements are formed to have a predetermined track shape in a data region, wherein in the recording layer processing step, concave portions of the concavo-convex pattern are formed to a midway in a thickness direction of the intermediate layer so that the recording layer is divided by the concave portions through to a face on a side of the substrate.

Alternatively, various exemplary embodiments of the present invention provide a manufacturing method of a magnetic recording medium comprising:

an object-to-be-processed preparation step of preparing an object to be processed which is formed by an intermediate layer and a recording layer that has magnetic anisotropy in a direction parallel to surface in this order over a substrate; and a recording layer processing step of processing the object to be processed by etching to divide the recording layer into a number of recording elements by a predetermined concavo-convex pattern such that the recording elements are formed to have a predetermined track shape in a data region, wherein in the recording layer processing step, concave portions of the concavo-convex pattern are formed to a midway in a thickness direction of the intermediate layer so that the recording layer is divided by the concave portions through to a face on a side of the substrate.

A "recording layer divided in a number of recording elements by a concavo-convex pattern" herein refers to a recording layer in which the concave portions of the concavo-convex pattern are formed at least to a depth that reaches the face on the substrate side, including not only a recording layer that consists of completely divided recording elements, but also a recording layer consisting of recording elements that are partially continuous in a region other than the concave portions (in a region of convex portion), and a recording layer consisting of recording elements that are continuously formed on part of the substrate such as helical (spiral) recording elements.

The term "etching rate" used herein means an etching amount per unit time.

The term "magnetic recording medium" used herein should not be limited to hard discs, "floppy" discs (registered trademark), magnetic tapes and the like which use only magnetism for writing and reading data, but should include other recording media such as magneto optical (MO) recording media that use light with magnetism, and heat assisted recording media that use heat with magnetism.

According to various exemplary embodiments of the present invention, the soft magnetic layer or the like under the recording layer is protected from the processing of the recording layer in which the recording layer is divided through to the face on the substrate side, whereby good recording/reproducing characteristics are achieved. Moreover, by forming an intermediate layer that has properties of enhancing the orientability of the recording layer such as to be in contact with the recording layer on the substrate side of the recording layer, the recording/reproducing characteristics can be further improved.

BRIEF DESCRIPTION OF THE DRAWINGS

Various exemplary embodiments of the present invention will be described in detail with reference to the accompanying drawings, wherein.

DETAILED DESCRIPTION OF THE PREFERRED EMBODIMENT

Various exemplary embodiments of this invention will be hereinafter described in detail with reference to the drawings.

Figure 1:
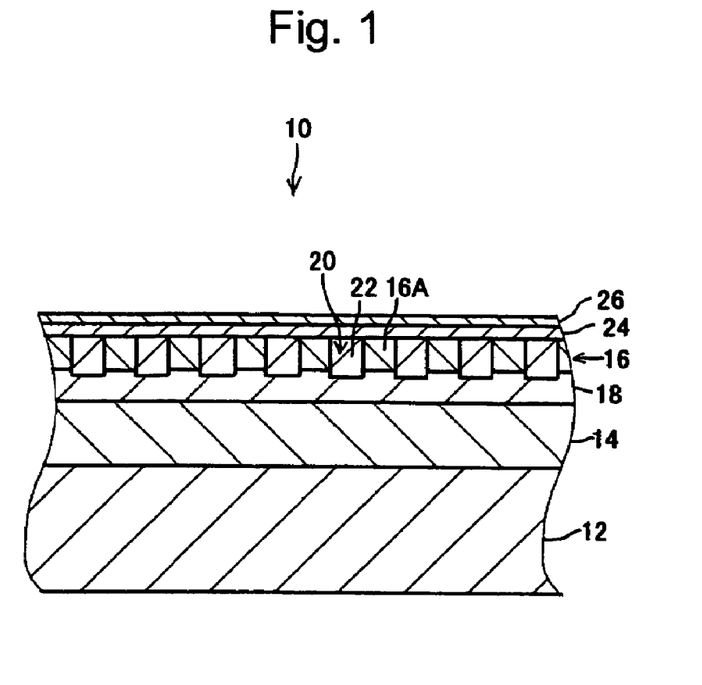
FIG. 1 is a schematic cross-sectional side view illustrating the structure of a magnetic recording medium according to a first exemplary embodiment of the present invention.

A first exemplary embodiment of the present invention relates to a perpendicular recording, discrete track type magnetic disc. As shown in FIG. 1, the magnetic recording medium 10 includes a substrate 12, a soft magnetic layer 14 formed over the substrate 12, a recording layer 16 formed over the soft magnetic layer 14 such as to have magnetic anisotropy in a direction perpendicular to surface, and being divided in a number of recording elements 16A by a predetermined concavo-convex pattern, and a non-magnetic intermediate layer 18 formed between the recording layer 16 and the soft magnetic layer 14.

The concave portions 20 of the concavo-convex pattern are formed to a midway of the intermediate layer 18 in a thickness direction. The recording layer 16 is divided through to the face on the substrate 12 side, whereas the intermediate layer 18 is continuous on a face on the side of the substrate 12. The concave portions 20 are filled with a non-magnetic material 22. Upon the recording elements 16A and the non-magnetic material 22 are formed a protection layer 24 and a lubricating layer 26 in this order.

The recording layer 16 is 5 to 30 nm in thickness, made of a CoCrPt alloy, and divided in recording elements 16A. The recording elements 16A, more specifically, are formed to have a concentric track shape formed at minute intervals in a radial direction in a data region. In a servo region, the recording elements 16A are formed in a predetermined servo information pattern.

One example of the method of forming the recording layer 16 by dividing a continuous recording layer into recording elements 16A is an ion beam etching process using Ar gas as the process gas.

The intermediate layer 18 is in contact with the recording layer 16 on the substrate 12 side of the recording layer 16 with a thickness of 2 to 40 nm and has properties of enhancing the orientability of the recording layer 16. Specific examples of the material for the intermediate layer 18 include Cr, a non-magnetic CoCr alloy, Ti (titanium), and the like.

Since ion beam etching generally has a processing accuracy of about ±1 nm, the intermediate layer 18 should preferably have a thickness of at least 2 nm so as to protect the soft magnetic layer 14 from the ion beam etching process that is performed to form the recording layer 16 by thoroughly dividing the continuous recording layer through to its face on the substrate 12 side. Further, in order to achieve the effect of enhancing the orientability of the recording layer 16, the thickness of the intermediate layer 18 should preferably be 20 nm or more.

Figure 2:
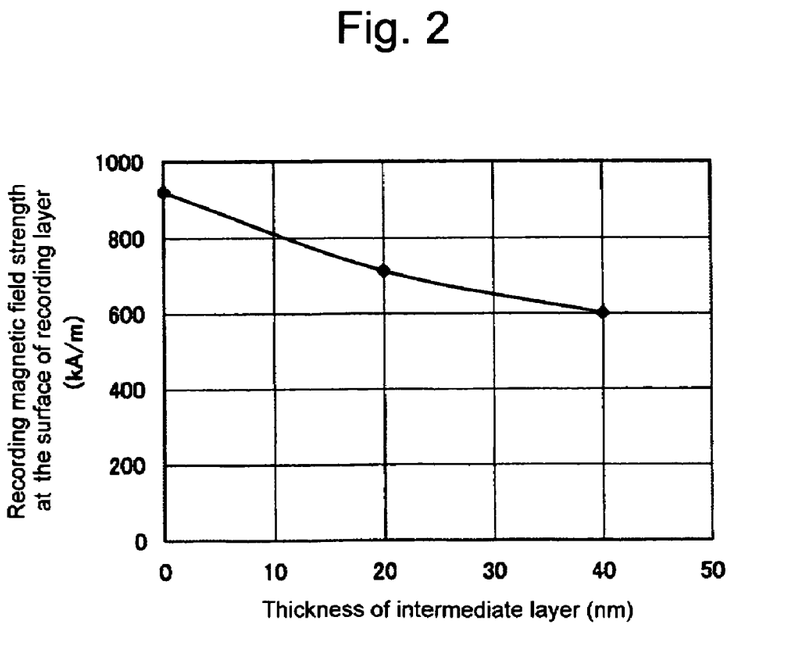
FIG. 2 is a graph showing the relationship between the thickness of intermediate layer and the recording magnetic field strength at the surface of recording layer.

On the other hand, too large a thickness of the intermediate layer 18 would adversely affect the recording performance because of the large gap between the recording layer 16 and the soft magnetic layer 14, and in this respect the intermediate layer 18 should preferably be as thin as possible. FIG. 2 is a graph showing the relationship between the thickness of the intermediate layer 18 and the strength of recording magnetic field at the surface of the recording layer 16 when a recording magnetic field is applied to the magnetic recording medium 10 using a recording head with currently highest possible recording performance. FIG. 2 indicates the tendency that the recording magnetic field strength at the surface of the recording layer 16 reduces with an increase in the thickness of the intermediate layer 18. The recording layer of currently available magnetic recording media such as hard discs has a coercivity (Hc) of as high as about 400 kA/m, and in order to ensure saturation magnetization of such a recording layer, it is necessary to apply a recording magnetic field of about 600 kA/m, which is 1.5 times larger than the coercivity of the recording layer. Accordingly, the thickness of the intermediate layer 18 should preferably be 40 nm or lower.

The substrate 12 is made of a non-magnetic material such as glass, alumina, and the like. The soft magnetic layer 14 has a thickness of 50 to 300 nm and is made of either an Fe (iron) alloy or Co (cobalt) alloy. The non-magnetic material 22 is $SiO_2$ (silicon dioxide). The protection layer 24 is 1 to 5 nm in thickness and made of a film of hard carbon that is also referred to as diamond like carbon. It should be noted that the term "diamond like carbon" (hereinafter "DLC") herein refers to a material that is mainly composed of carbon and has an amorphous structure and a hardness of about $2 \times 10^9$ to $8 \times 10^{10}$ Pa measured by Vickers hardness testing. The lubricating layer 26 has a thickness of 1 to 2 nm and is made of PFPE (perfluoropolyether).

Next, the effects that the magnetic recording medium 10 produce will be described.

Since the intermediate layer 18 is formed between the recording layer 16 and the soft magnetic layer 14, the soft magnetic layer 14 is protected by the intermediate layer 18 from the processing of the recording layer 16 in which a continuous recording layer is divided through to the face on the substrate 12 side, and maintained as a continuous film with uniform thickness, whereby good recording/reproducing characteristics of the magnetic recording medium 10 are achieved.

Also, because the intermediate layer 18 having properties that enhance the orientability of the recording layer 16 is in contact with the recording layer 16 on the substrate 12 side of the recording layer 16, the recording layer 16 allows better orientation, resulting in improved recording/reproducing characteristics.

The intermediate layer 18 is made of a material that has a lower etching rate than the recording layer 16 relative to ion beam etching that is performed using Ar gas as the process gas. Therefore, the intermediate layer 18, which protects the soft magnetic layer 14 from the ion beam etching process to form the recording layer 16, can be made thin, and the gap between the recording layer 16 and the soft magnetic layer 14 is accordingly made small, leading to an improvement in the recording characteristics.

It should be noted that in some cases depending on the material and thickness and other conditions of the recording layer 16 and the soft magnetic layer 14, an intermediate layer of an appropriate thickness interposed between the recording layer 16 and the soft magnetic layer 14 can enhance the reproducing magnetic field resulting in better reproducing characteristics, as compared to a structure wherein the recording layer 16 and the soft material layer 14 are directly in contact with each other.

Moreover, since the intermediate layer 18 is made of a material that has a lower etching rate than the recording layer 16 relative to ion beam etching that is performed using Ar gas as the process gas, the continuous recording layer is thoroughly divided through to the face on the side of the substrate 12 to form the recording layer 16 by ion beam etching, without causing the concave portions of the concavo-convex pattern to be too deep. This will keep the filling or deposition amount of the non-magnetic material 22 and an excess amount thereof removed in the flattening process low, leading to improved productivity.

As the concave portions 20 between the recording elements 16A are filled with the non-magnetic material 22, the magnetic recording medium 10 has a flat surface and the head flying height is made stable, resulting in good recording/reproducing characteristics.

Since the recording elements 16A are formed to have a track shape in the data region, the magnetic recording medium 10 can achieve a high areal density without causing the problems of writing data on adjacent tracks of a recording target track or cross-talk at the time of reproducing. Also, because the recording elements 16A extend continuously over the entire width of the tracks, they can achieve a large reproducing magnetic field accordingly.

The recording elements 16A are divided from each other, and since there is no recording layer 16 in the concave portions 20 between the recording elements 16A, no noise is generated from the concave portions 20. Further, since the soft magnetic layer 14 is a continuous film having a uniform thickness, both lead to good recording/reproducing characteristics of the magnetic recording medium 10.

Figure 3:
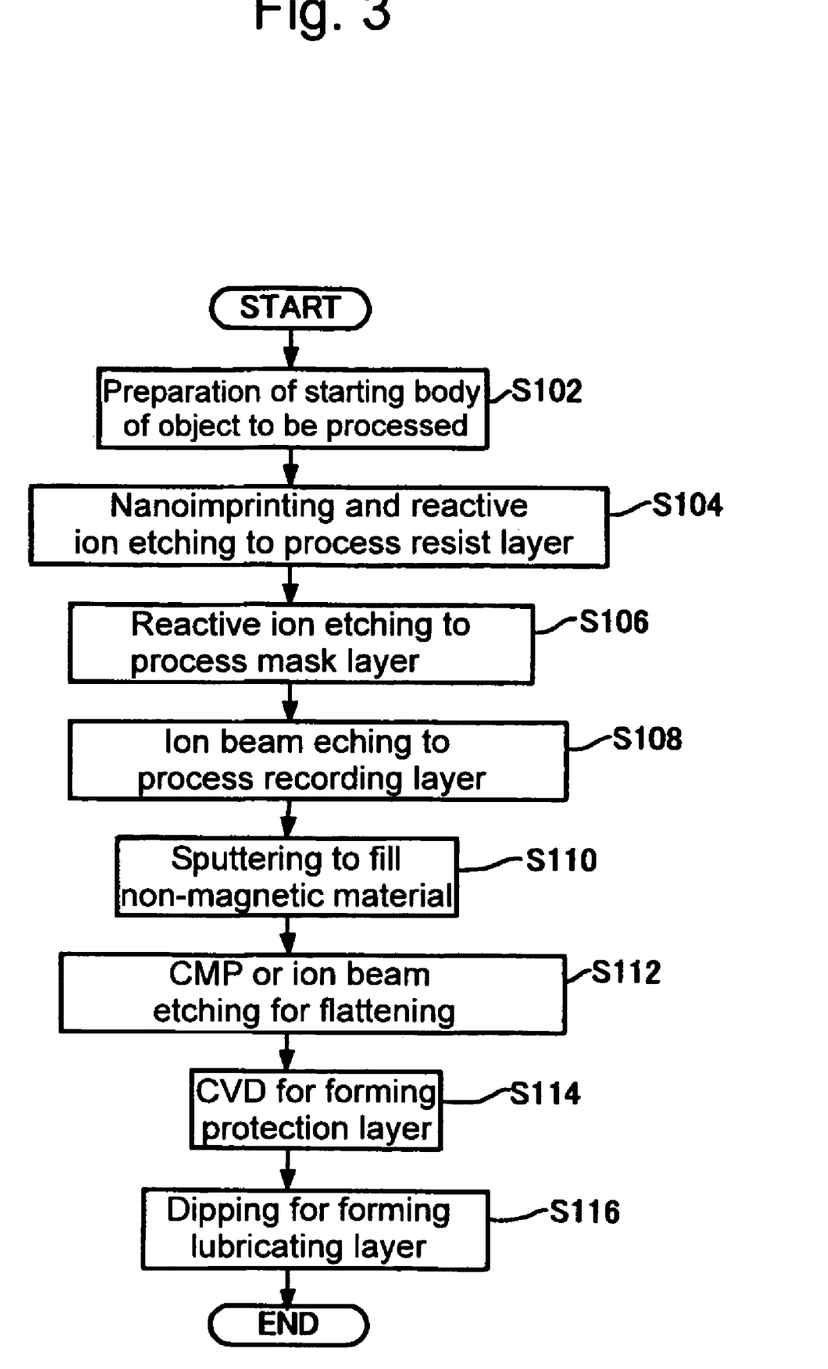
FIG. 3 is a flowchart showing an overall manufacturing process of the magnetic recording medium.

The manufacturing method of the magnetic recording medium 10 will be described next in accordance with the flowchart of FIG. 3.

Figure 4:
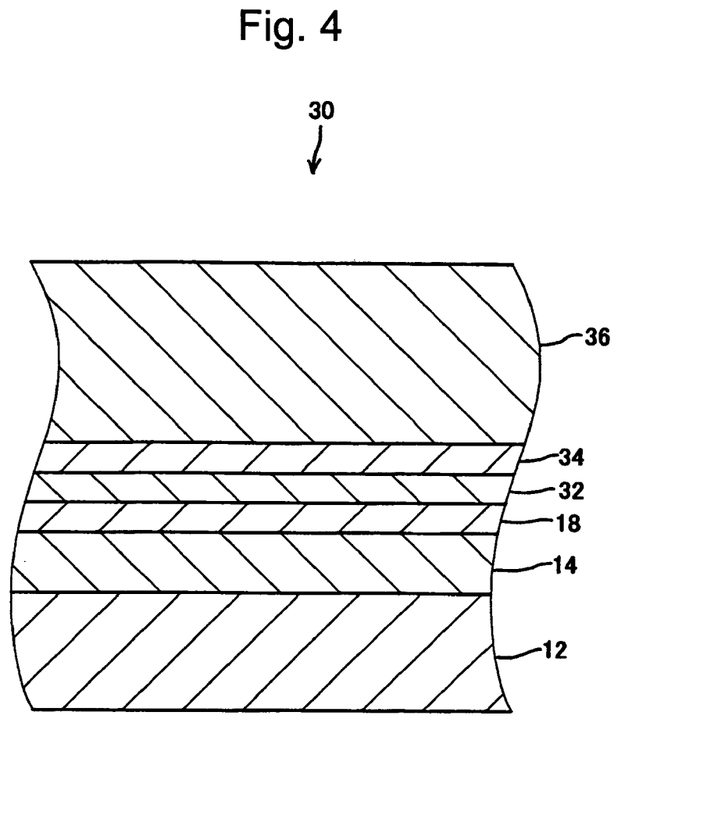
FIG. 4 is a schematic cross-sectional side view illustrating the structure of a starting body of an object to be processed in the manufacturing process of the magnetic recording medium.

First, a starting body of an object to be processed 30 as shown in FIG. 4 is prepared (S102). More specifically, the soft magnetic layer 14, the intermediate layer 18, a continuous recording layer 32, and a mask layer 34 are formed in this order over the substrate 12 by a sputtering process, after which a resist layer 36 is formed by spin coat application, to obtain the starting body of the object to be processed 30. The resist layer 36 may be formed by a dipping method. The mask layer 34 here is 3 to 50 nm in thickness and made of C, Ta, DLC and the like, and the resist layer 36 has a thickness of 30 to 300 nm.

Next, a concavo-convex pattern corresponding to a predetermined servo pattern is transferred to a servo region of the resist layer 36, and a concavo-convex pattern corresponding to tracks that are finely pitched in the radial direction to a data region, by a nanoimprint method, after which the resist layer 36 in the bottom of the concave portions of both the concavo-convex patterns is removed by a reactive ion etching process using $O_2$ gas or the like as the reactive gas (S104). The concavo-convex patterns may also be formed by exposure and development processes of the resist layer 36.

Figure 5:
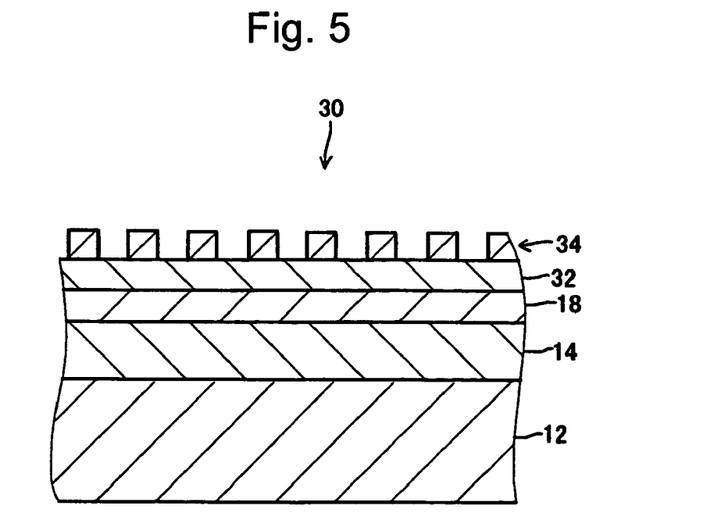
FIG. 5 is a schematic cross-sectional side view illustrating the shape of the object processed to have a mask layer in a concavo-convex pattern.

The mask layer 34 at the bottom of the concave portions is then removed by a reactive ion etching process using $SF_6$ (sulfur hexafluoride) gas as the reactive gas (S106). Thereby, the continuous recording layer 32 is exposed in the bottom of the concave portions as shown in FIG. 5.

Figure 6:
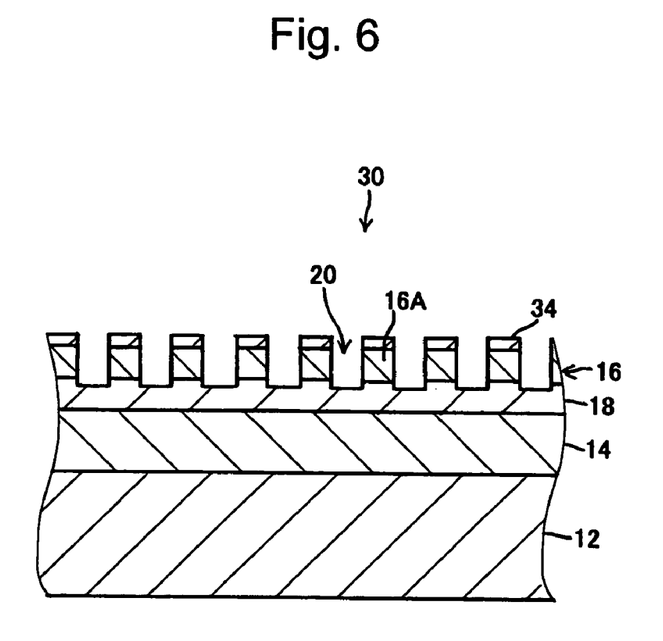
FIG. 6 is a schematic cross-sectional side view illustrating the shape of the object processed to have a recording layer in a concavo-convex pattern.

Next, the continuous recording layer 32 at the bottom of the concave portions is removed by ion beam etching using Ar gas as the process gas. At this time, the intermediate layer 18 is also removed partially in the thickness direction. Thereby, the continuous recording layer 32 is divided into a number of recording elements 16A as shown in FIG. 6, thus formed into the recording layer 16 (S108). The mask layer 34 remaining on the top of the recording elements 16A is then completely removed by a reactive ion etching process using $SF_6$ gas as the reactive gas.

Figure 7:
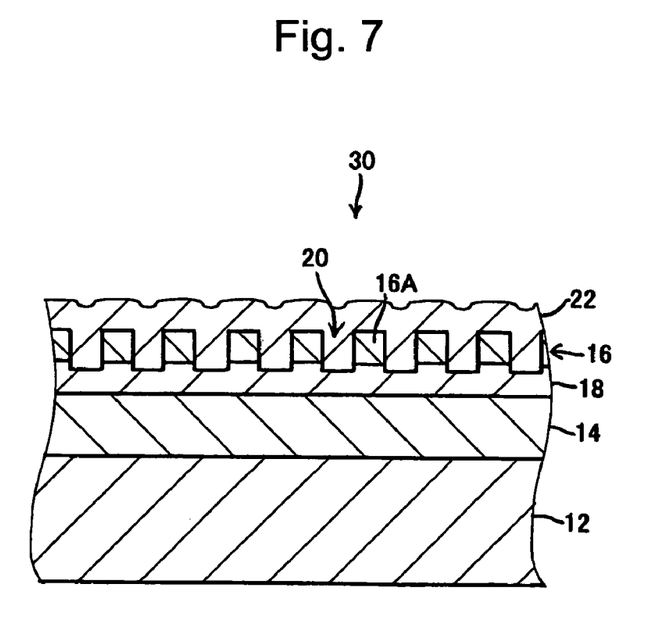
FIG. 7 is a schematic cross-sectional side view illustrating the shape of the object after the filling of a non-magnetic material.

Next, $SiO_2$ (non-magnetic material 22) particles are deposited on the object to be processed 30 as shown in FIG. 7 by a sputtering process, to fill the concave portions 20 between the recording elements 16A (S110). The non-magnetic material 22 is deposited such as to completely cover the recording elements 16A.

The excess non-magnetic material 22 above the recording elements 16A is then removed either by a CMP (chemical mechanical polishing) method or an ion beam etching method, so as to flatten the surface of the recording elements 16A and non-magnetic material 22 (S112). The "excess non-magnetic material 22" here means the non-magnetic material 22 that is present above the recording elements 16A (on the upper side (opposite side of the substrate 12) of the upper surface of the recording elements 16A).

Next, the protection layer 24 is formed on top of the recording elements 16A and the non-magnetic material 22 by a CVD (chemical vapor deposition) method (S114). Further, the lubricating layer 26 is formed on the protection layer 24 by a dipping method (S116). Thereby, the magnetic recording medium 10 shown in FIG. 1 is complete.

A second exemplary embodiment of the present invention will be described next.

Figure 8:
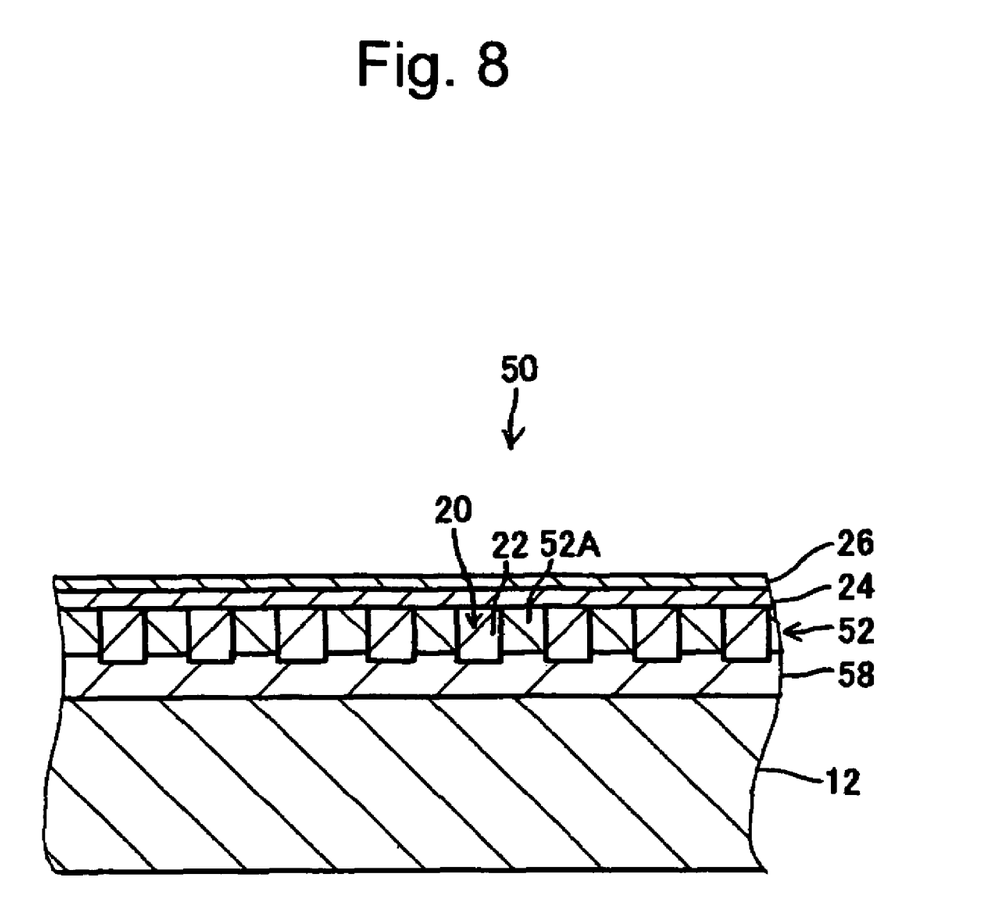
FIG. 8 is a schematic cross-sectional side view illustrating the structure of a magnetic recording medium according to a second exemplary embodiment of the present invention.

The second exemplary embodiment of the present invention relates to a longitudinal recording, discrete track type magnetic disc. As shown in FIG. 8, the magnetic recording medium 50 includes a substrate 12, a recording layer 52 formed over the substrate 12 such as to have magnetic anisotropy in a direction parallel to surface, and being divided in a number of recording elements 52A by a predetermined concavo-convex pattern, and a non-magnetic intermediate layer 58 formed between the recording layer 52 and the substrate 12. Since other elements are the same as those of the magnetic recording medium 10 of the previously described embodiment, these elements are given the same reference numerals shown in FIG. 1 and description thereof will be omitted. Also, the description of the manufacturing method of the magnetic recording medium 50 will be omitted, since it is the same as with the previously described magnetic recording medium 10.

The recording layer 52 is 10 to 15 nm in thickness, made of a CoCrPt alloy, and divided in a number of recording elements 52A.

One example of the method of forming the recording layer 52 by dividing a continuous recording layer into recording elements 52A is, as with the previously described recoding layer 16, an ion beam etching process using Ar gas as the process gas.

The intermediate layer 58, as with the previously described intermediate layer 18, is in contact with the recording layer 52 on the substrate 12 side of the recording layer 52 with a thickness of 2 to 40 nm and has properties of enhancing the orientability of the recording layer 52. Specific examples of the material for the intermediate layer 58 include Cr, a non-magnetic CoCr alloy, and the like. The thickness of the intermediate layer 58 should be at least 2 nm in order to protect the substrate 12 from the ion beam etching process, and should preferably be 20 nm or more in order to increase the orientation effect of the recording layer 52.

As with the previously described magnetic recoding medium 10, since the intermediate layer 58 having properties that enhance the orientability of the recording layer 52 is in contact with the recording layer 52 on the substrate 12 side of the recording layer 52, the recording layer 52 allows better orientation, resulting in improved recording/reproducing characteristics of the magnetic recording medium 50.

Moreover, since the intermediate layer 58 is made of a material that has a lower etching rate than the recording layer 52 relative to ion beam etching, the continuous recording layer is thoroughly divided through to the face on the side of the substrate 12 to form the recording layer 52 by the ion beam etching, without causing the concave portions of the concavo-convex pattern to be too deep. This will keep the filling or deposition amount of the non-magnetic material 22 and an excess amount thereof removed in the flattening process low, leading to improved productivity.

As the concave portions 20 between the recording elements 52A are filled with the non-magnetic material 22, the magnetic recording medium 50 has a flat surface and the head flying height is made stable, resulting in good recording/reproducing characteristics.

While ion beam etching using Ar gas is shown as one example of the etching process to form the recording layer 16, 52 from the continuous recording layer in the first or second exemplary embodiment described above, other rare gases such as Kr (krypton) or Xe (xenon) or the like may be used in the ion beam etching.

While Cr or a non-magnetic CoCr alloy and the like are shown as one example for the material of the intermediate layer 18, 58 in the first or second exemplary embodiment described above, C or Ta may be used instead, which is preferable in the respect that it will further reduce the etching rate relative to the ion beam etching for forming the recording layer 16, 52 from the continuous recording layer. Magnetic materials may also be used for the intermediate layer 18, 58 as long as the materials do not cause substantially adverse effects such as magnetic noise on the data recording/reproducing characteristics of the recording layer 16.

While ion beam etching is shown as one example of the etching process to form the recording layer 16, 52 from the continuous recording layer in the first or second exemplary embodiment described above, a reactive ion etching process may be used for forming the recording layer 16, 52 using CO (carbon monoxide) and a nitrogen mixed gas such as $NH_3$ or the like as the reactive gas. In this case, TiN (titanium nitride) can be used for the material of the mask layer formed on the continuous recording layer for forming the recording layer 16, 52.

If reactive ion etching is performed using CO and a nitrogen mixed gas such as $NH_3$ or the like as the reactive gas for the etching process of forming the recording layer 16, 52 from the continuous recording layer, the material of the intermediate layer 18, 58 should preferably be Cr, a non-magnetic CoCr alloy, Ti and the like, which have a lower etching rate than the CoCrPt alloy of the recording layer 16, 52 relative to the reactive ion etching. In the case with discrete track media or patterned media, recording elements that correspond to a servo pattern are formed in a servo region at the same time when recording elements that correspond to tracks are formed in a data region, as in the first exemplary embodiment described above. However, the pattern interval (width of concave portions) of servo patterns such as a burst pattern, address pattern, and the like is not uniform, ranging for example from about 100 nm to 1 μm. When forming such a commonly used servo pattern by a reactive ion etching process, the processing speed is liable to change by the width of the concave portions, and, taking account also of etching stop precision, there are usually variations in the depth of concave portions of about ±5 nm. Accordingly, if the intermediate layer 18, 58 has a thickness of 10 nm or more, it can protect the soft magnetic layer 14 or the like from the reactive ion etching process while allowing the continuous recording layer to be thoroughly divided through to the face on the substrate 12 side, which is preferable, as it broadens the range of processing methods.

It should be noted that in the case where the intermediate layer 18, 58 is made of a material that has an equal or higher etching rate than the recording layer 16, 52 relative to the etching process for forming the recording layer 16, 52 from a continuous recording layer, it is also advantageous to form the intermediate layer on the substrate 12 side of the recording layer 16, 52, as it enhances the orientability of the recording layer 16, 52 and protects the layer under the recording layer 16, 52 from the etching process.

Further, in the case where the intermediate layer 18, 58 is made of a material that does not have the orientability enhancing effect for the recording layer 16, 52, it is still advantageous to form the intermediate layer on the substrate 12 side of the recording layer 16, 52, as it protects the layer under the recording layer 16, 52 from the etching process.

While the intermediate layer 18, 58 has a single layer structure in the first or second exemplary embodiment described above, a multiple-layer intermediate layer may be formed on the substrate 12 side of the recording layer 16, 52. For example, a layer that has a high effect of enhancing the orientability of the recording layer 16, 52 may be formed in direct contact with the recording layer 16, 52, and another layer may be formed in addition from a material that has a very low etching rate relative to the etching process for forming the recording layer 16, 52 from a continuous recording layer.

While the non-magnetic material 22 used in the first or second exemplary embodiment described above is $SiO_2$, it is not a requirement and any other material can be used as long as it is non-magnetic.

While the concave portions 20 between the recording elements 16A, 52A are filled with the non-magnetic material 22 in the first or second exemplary embodiment described above, the concave portions 20 may be left as gaps. In this case, too, because the intermediate layer 18, 58 provides a restriction on the depth of the concave portions 20, variations in the head flying height are suppressed, and the effect of improving the recording/reproducing characteristics is achieved.

While the recording layer 16, 52 is made of a CoCrPt alloy in the first or second exemplary embodiment described above, this is not a requirement and any other material may be used as long as it is a magnetic material that will provide good recording/reproducing characteristics. For example, the recording layer 16, 52 may be made of other alloys containing a iron group element (Co, Fe, and Ni) or other material such as a laminated piece of these alloys.

While the continuous recording layer 32 is divided by etching at two stages after forming the mask layer 34 and the resist layer 36 in the first exemplary embodiment described above, this is not a requirement and the materials of the resist layer and the mask layer, number of lamination, thickness, and the type of etching may be freely selected, as long as the continuous recording layer 32 is divided with high precision.

The soft magnetic layer 14 is formed under the intermediate layer 18 in the above-described first exemplary embodiment while the intermediate layer 58 is directly formed on the substrate 12 in the above-described second exemplary embodiment, but the structure between the intermediate layer 18, 58 and the substrate 12 may be variously designed in accordance with the type of the magnetic recording medium. For example, an underlayer may be formed on the substrate 12, on which the soft magnetic layer 14 and the intermediate layer 58 may be formed.

While the magnetic recording medium 10, 50 of the above-described first or second exemplary embodiment is a discrete track type magnetic disc wherein recording elements 16A, 52A are formed in the data region parallelly with a fine pitch in the radial direction of tracks, the present invention is obviously applicable to other magnetic discs such as a magnetic disc wherein the recording elements are formed parallelly with a fine pitch in the circumferential direction (sector direction) of the tracks, a magnetic disc wherein the recording elements are formed parallelly with a fine pitch in both radial and circumferential directions, and a magnetic disc wherein the tracks are formed in a spiral. Also, the present invention is applicable to a magneto-optical (MO) disc, heat assisted magnetic disc which uses heat together with magnetism, and other non-disc-like magnetic recording media such as magnetic tapes that have a recording layer with a concavo-convex pattern.

The present invention is applicable, for example, to magnetic recording media such as discrete track media or patterned media, wherein a recording layer is formed over a substrate and divided in a number of recording elements by a predetermined concavo-convex pattern.

What is claimed is:

1. A magnetic recording medium comprising:
   a substrate;
   a soft magnetic layer formed over the substrate;
   a recording layer formed over the soft magnetic layer such as to have magnetic anisotropy in a direction perpendicular to surface, and being divided in a number of recording elements by a predetermined concavo-convex pattern; and
   an intermediate layer formed between the recording layer and the soft magnetic layer, wherein
   the recording elements are formed to have a predetermined shape of tracks in a data region,
   the recording elements extend continuously over entire width of the tracks,
   concave portions of the concavo-convex pattern are formed to a midway in a thickness direction of the intermediate layer, the recording layer is divided by the concave portions through to a face on a side of the substrate, the intermediate layer is continuous on a face on the side of the substrate, the concave portions of the concavo-convex pattern are not formed in the soft magnetic layer, the soft magnetic layer is a continuous film, and the magnetic recording medium does not comprise any soft magnetic film in which the concave portions of the concavo-convex pattern are formed.

2. The magnetic recording medium according to claim 1, wherein at least part of the intermediate layer in a thickness direction is an orientation film that has properties of enhancing orientability of the recording layer, the orientation film being formed in contact with the recording layer on the substrate side of the recording layer.

3. The magnetic recording medium according to claim 1, wherein the intermediate layer has a thickness of 2 to 40 nm.

4. The magnetic recording medium according to claim 1, wherein concave portions of the concavo-convex pattern are filled with a non-magnetic material.

5. The magnetic recording medium according to claim 1, wherein at least part of the intermediate layer in a thickness direction is an etch stop film that has a lower etching rate than the recording layer relative to a predetermined etching process.

6. The magnetic recording medium according to claim 5, wherein the etching process is an ion beam etching process.

7. The magnetic recording medium according to claim 5, wherein the etching process is a reactive ion etching process using carbon monoxide and a nitrogen-containing mixed gas as a reactive gas.

8. A manufacturing method of a magnetic recording medium comprising:

an object-to-be-processed preparation step of preparing an object to be processed in which a soft magnetic layer, an intermediate layer, and a recording layer that has magnetic anisotropy in a direction perpendicular to surface are formed in this order over a substrate; and a recording layer processing step of processing the object to be processed by etching to divide the recording layer into a number of recording elements by a predetermined concavo-convex pattern such that the recording elements are formed to have a predetermined shape of tracks in a data region and the recording elements extend continuously over entire width of the tracks, wherein in the recording layer processing step, concave portions of the concavo-convex pattern are formed to a midway in a thickness direction of the intermediate layer so that the recording layer is divided by the concave portions through to a face on a side of the substrate, the intermediate layer is continuous on a face on the side of the substrate, the concave portions of the concavo-convex pattern are not formed in the soft magnetic layer, the soft magnetic layer is a continuous film, and the magnetic recording medium does not comprise any soft magnetic film in which the concave portions of the concavo-convex pattern are formed.

9. The manufacturing method of a magnetic recording medium according to claim 8, wherein in the object-to-be-processed preparation step, at least part of the intermediate layer in a thickness direction is formed as an orientation film having properties of enhancing the orientability of the recording layer, the recording layer being formed in contact with the orientation film.

10. The manufacturing method of a magnetic recording medium according to claim 8, wherein in the object-to-be-processed preparation step, the intermediate layer is formed to a thickness of 2 to 40 nm.

11. The manufacturing method of a magnetic recording medium according to claim 8, wherein at least part of the intermediate layer in a thickness direction is formed as an etch stop film having a lower etching rate than the recording layer relative to an etching process in the recording layer processing step.

12. The manufacturing method of a magnetic recording medium according to claim 8, further comprising, after the recording layer processing step, a non-magnetic material filling step of filling concave portions of the concavo-convex pattern with a non-magnetic material, and a flattening step of flattening the surface of the recording elements and the non-magnetic material by removing an excess amount of the non-magnetic material above the recording elements.

* * * * *